Feb. 17, 1925. 1,526,312
O. BEHIMER
GAUGE MOUNTING FOR STILLS
Filed Oct. 27, 1920
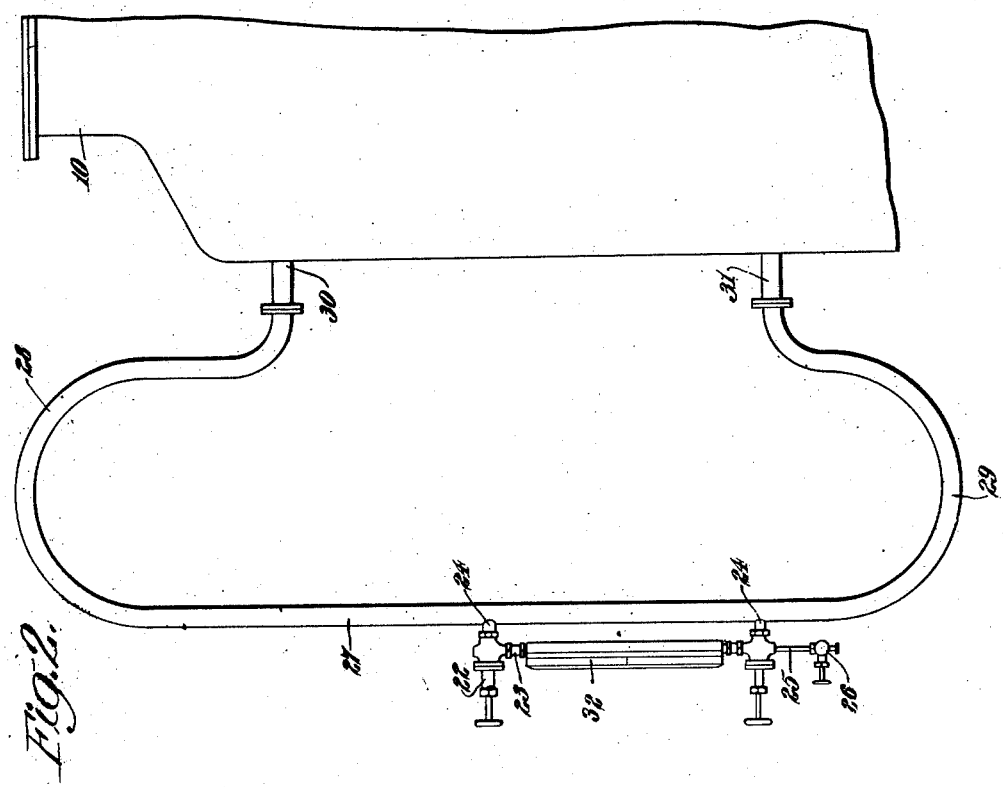
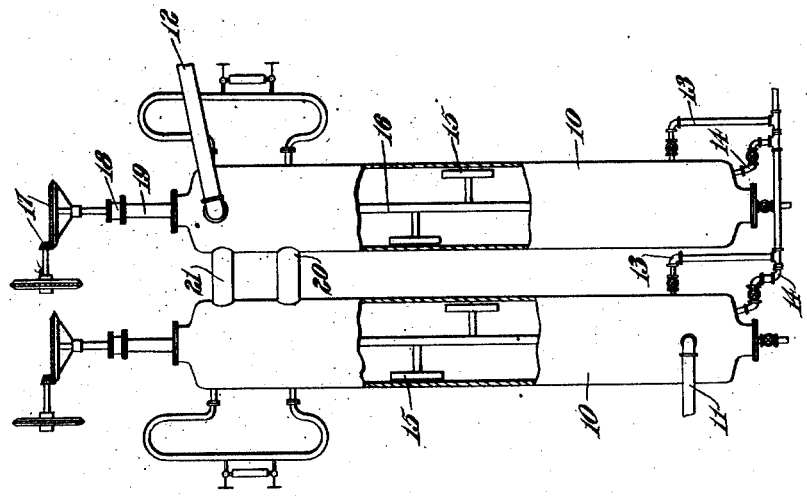
Inventor
Otto Behimer
By his Attorney Patented Feb. 17, 1925.

1,526,312

UNITED STATES PATENT OFFICE.

OTTO BEHIMER, OF PORT ARTHUR, TEXAS, ASSIGNOR TO THE TEXAS COMPANY, OF NEW YORK, N. Y., A CORPORATION OF TEXAS.

GAUGE MOUNTING FOR STILLS.

Application filed October 27, 1920. Serial No. 419,806.

*To all whom it may concern:*

Be it known that I, OTTO BEHIMER, a citizen of the United States, residing in Port Arthur, in the county of Jefferson and State of Texas, have invented certain new and useful Improvements in Gauge Mountings for Stills, of which the following is a specification.

This invention relates to mechanism for indicating the liquid levels of stills, boilers, retorts and the like and has special reference to such mechanism for indicating liquid levels in stills or boilers wherein distillation is carried on under high temperatures and pressures.

It is common practice to attach a liquid level gauge by means of a direct connection to a still or boiler in such manner that there is distillation within the gauge with currents of heated fluid circulating through it. With such a construction not only is it impossible to obtain an accurate indication of the liquid level but the gauge becomes overheated and, particularly when operating at elevated temperatures and under more or less pressure, leaking and breaking of the gauge results, thus creating great danger in carrying on the distillation process.

In accordance with this invention the gauge is protected by means of a fluid seal and in the embodiment of the invention described in detail herein there is provided a liquid seal and a gas pocket by which the liquid within the gauge and the gauge itself are maintained in a relatively cool condition, practically at the temperature of the atmosphere. Heated currents are prevented from flowing through the gauge and an accurate indication of the liquid level in the still or boiler is made possible.

The invention has special reference to stills in which hydrocarbon oils are subjected to heat and pressure for the decomposition of higher boiling hydrocarbons into those of lower boiling ones.

I will now proceed to give a detailed description of my invention reference being had to the accompanying drawings which illustrate the preferred form of the invention and in which:

Figure 1 is an elevation partly in section of a battery of stills equipped with an apparatus constructed in accordance with my invention and constituting an embodiment thereof.

Figure 2 is a fragmentary section of one of the stills showing the gauge mounting in detail.

My invention is adapted for indicating the liquid level in a single still or boiler but inasmuch as considerable difficulty is ordinarily experienced in providing means for indicating the liquid level of a battery or a plurality of stills and since my improved mechanism is particularly adapted for use in connection with a series of stills the invention will be described herein as applied to a battery of stills such as the stills 10 which are provided with a suitable charging line 11 and a vapor line 12. Draw-off lines 13 and 14 and scrapers 15 may also be provided. As illustrated the scrapers are carried by the shaft 16 which is operated through the gears 17, the shaft being provided with a stuffing box 18 which is elevated somewhat above the stills by means of the pipe 19 in order to maintain the stuffing box in a fairly cool condition. It is understood that the stills are provided with vapor lines, air condensers or separators, condensers, receiving tanks and such other accessories as may be desired and which it is unnecessary to describe herein. A liquid level line 20 and vapor equalizing line 21 are provided in order that the stills may be maintained at substantially the same level.

The still, the liquid level of which it is desired to observe, and in case of a battery of stills preferably each still, is provided with a suitable liquid level gauge 32. This gauge may be of the type known as the reflex gauge or any other suitable kind of liquid level indicating mechanism. The gauge is provided with the usual valves 22 and with the connections 23 and 24 through which the fluid from the still is given access to the gauge. The gauge may be equipped with a drain pipe 25 provided with the valve 26. The connections 24 communicate with the still by means of a vertically disposed pipe or conduit 27 which contains an upper inverted U bend 28 and a lower U bend 29. The upper bend is connected with the vapor portion of the still at 30. The lower bend extends to the liquid portion of the still terminating at 31.

When the stills are charged with the oil to be treated the bend 29 is filled with liquid and since there are no heated currents circulating through the pipe 27, the liquid in the lower bend is maintained at a comparatively low temperature during the distillation. As soon as vaporization begins in the still 10 vapors and gases will collect in the upper bend 28. Ordinarily when cracking hydrocarbon oils in the still 10 the upper bend 28 will become filled with permanent gases with possibly small portions of vapors which are uncondensable at the temperature of the pipe. The permanent or uncondensable gases or vapors are lighter than the condensable gases and the natural tendency is for them to rise and collect in the upper portion of the inverted U-bend 28. By reason of the gas pocket in the bend 28 and the liquid seal in the bend 29 there is no distillation and no circulation through the tube 27 of any current of heated fluid and consequently the fluid entering the lines 24 and coming in contact with the gauge 32 is at a temperature greatly below that in the still with the result that there is no danger of over-heating the gauge and causing it to break under excessive temperature. At the same time the liquid in the tube 27 is held at a height corresponding to the liquid level in the still which height is reflected in the gauge 32 thereby establishing at all times a correct indication by the gauge.

By enabling a correct indication of the liquid level in stills and boilers under high temperatures and pressures my invention has made possible the successful operation of processes which prior thereto were attended with the greatest difficulties and dangers and were in fact practically impossible of being carried on commercially. For example, in continuous distillation processes where the liquid to be distilled is constantly supplied to the stills and the evolved products constantly withdrawn it is essential that facilities be provided for indicating the level in the stills. By means of my invention this is accomplished in a satisfactory manner thereby making possible the successful conduct of such processes.

What I claim is:

1. A gauge mounting for stills of the class described comprising a pipe having a U-bend attached to the liquid portion of the still, a pipe having an inverted U-bend attached to the vapor portion of the still, a vertically disposed pipe joining and establishing a free connection between the two U-bends and means for indicating the level of the liquid in said vertically disposed pipe.

2. A gauge mounting for stills comprising a liquid level gauge, a vapor conduit formed to provide a gas pocket therein connecting the gauge with the still, and a liquid conduit formed to provide a liquid seal therein connecting the gauge with the still.

3. A gauge mounting for stills comprising a liquid level gauge and a chamber at a distance from the still establishing communication between the still and said gauge and formed to provide a fluid seal therein adapted to retard the transmission of heat from the still to the gauge.

4. A gauge mounting for stills, comprising a pipe having a vertically disposed portion and a curved portion connecting said vertical portion with the vapor portion of the still and constituting a gas pocket and a curved portion connecting the opposite end of the vertical portion of said pipe with the liquid portion of the still and constituting a liquid seal, a liquid level gauge, and means for attaching said gauge to the vertical portion of said pipe.

5. A gauge mounting for stills, comprising a pipe communicating with the vapor and liquid portion of the still and formed near the upper end to provide a gas seal, and means for indicating the liquid level in said pipe.

In witness whereof, I have hereunto set my hand this 19th day of October, 1920.

OTTO BEHIMER.